(12) United States Patent
Lawrence et al.

(10) Patent No.: US 8,240,553 B2
(45) Date of Patent: Aug. 14, 2012

(54) METHOD AND APPARATUS FOR PROVIDING ELECTRONIC DATA

(75) Inventors: Richard Anthony Lawrence, Bristol (GB); James T. Edward McDonnell, Bristol (GB); Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1447 days.

(21) Appl. No.: 11/492,967

(22) Filed: Jul. 26, 2006

(65) Prior Publication Data

US 2007/0090186 A1    Apr. 26, 2007

(30) Foreign Application Priority Data

Oct. 25, 2005    (GB) .................................. 0521685.8

(51) Int. Cl.
*G06K 7/10* (2006.01)
*G07D 11/00* (2006.01)

(52) U.S. Cl. .................................. 235/379; 235/462.45

(58) Field of Classification Search ................... 235/379, 235/462.45, 462.46
See application file for complete search history.

(56) References Cited

U.S. PATENT DOCUMENTS 6,375,077 B1 * 4/2002 Hankins ................... 235/462.45
2002/0145047 A1 * 10/2002 Goodwin, III ........... 235/462.46

FOREIGN PATENT DOCUMENTS

| EP | 1117055 A2 | 7/2001 |
| EP | 1363225 A2 | 11/2003 |
| GB | 2313940 A | 12/1997 |
| GB | 2313941 A | 12/1997 |
| GB | 2325 550 A | 11/1998 |
| GB | 2386235 | 9/2003 |
| GB | 2392530 | 3/2004 |

* cited by examiner

*Primary Examiner* — Thien M Le

(57) ABSTRACT

Apparatus for providing electronic data associated with an item to a user, the apparatus comprising a memory tag scanner arranged to communicate with a memory tag associated with an item, a user profile memory arranged to store user profile data therein, an output interface arranged to provided data to a user, and a data processor arranged to cause data to be selectively read from the memory tag associated with an item and the data to be selectively provided to a user via the output interface in accordance with the stored user profile data.

14 Claims, 5 Drawing Sheets

```
<Product Information>

<Nutrition>

<Fat> 7.9% </Fat>
        <Allergy> Nuts </Allergy>
              .
              .
              .
    </Nutrition>

<Packaging> Recyclable </Packaging>

<CountryOrigin> NowhereLand </CountryOrigin>

</Product Information>
```

Fig. 4

METHOD AND APPARATUS FOR PROVIDING ELECTRONIC DATA

Modern consumers desire to have available to them a large quantity of information concerning products that the consumer intends or wishes to purchase. Where the product is a food item this information may include dietary and nutritional information. Equally, when the product is an electrical item the information required may relate to the energy consumption of the product or the recyclable attributes of the product. The extent of the information that consumers now require or desire is in excess of that which is easily accommodated by conventional labelling. Even where such information can be provided on a conventional label, consumers often find it desirable for certain elements of the labelled information to be more readily apparent than others. Those elements of the labelled information that is of interest to user can vary between different individual users.

It is known to provide users within a self-service store with personal electronic devices that incorporate a conventional barcode scanner. The user is then able to scan the barcodes that are included on the labels of products to determine information concerning the product. However, the amount of information that can be encoded within a barcode is relatively small, typically simply identifying the product and its purchase price. Consequently, the relatively large amount of additional product information now required by consumers cannot be conveniently encoded by a barcode. Whilst it would be possible for the consumer device to use the encoded product identifier to look up further information stored on an appropriate database, the database either being stored on the user device itself or being remotely accessed by the user device, this significantly increases the complexity of the user device and/or the in-store data infrastructure.

According to a first aspect of the present invention there is provided apparatus for providing electronic data associated with an item to a user, the apparatus comprising a memory tag scanner arranged to communicate with a memory tag associated with an item, a user profile memory arranged to store user profile data therein, an output interface arranged to provide data to a user, and a data processor arranged to cause data to be read from the memory tag associated with an item and the data to be selectively provided to a user via the output interface in accordance with the stored user profile data.

According to a second aspect of the present invention there is provided a method of providing electronic data associated with an item to a user, the method comprising providing user profile data to a user apparatus, operating the user apparatus to read electronic data from a memory tag associated with an item, and selectively providing the electronic data to an output interface of the user apparatus in accordance with the user profile data.

Embodiments of the present invention will now be described, by way of illustrative example only, with reference to the accompanying figures of which:

FIG. 1 schematically illustrates the use of apparatus according to an embodiment of the present invention;

FIG. 4 is an example of data content stored on a tag.

Figure 1:
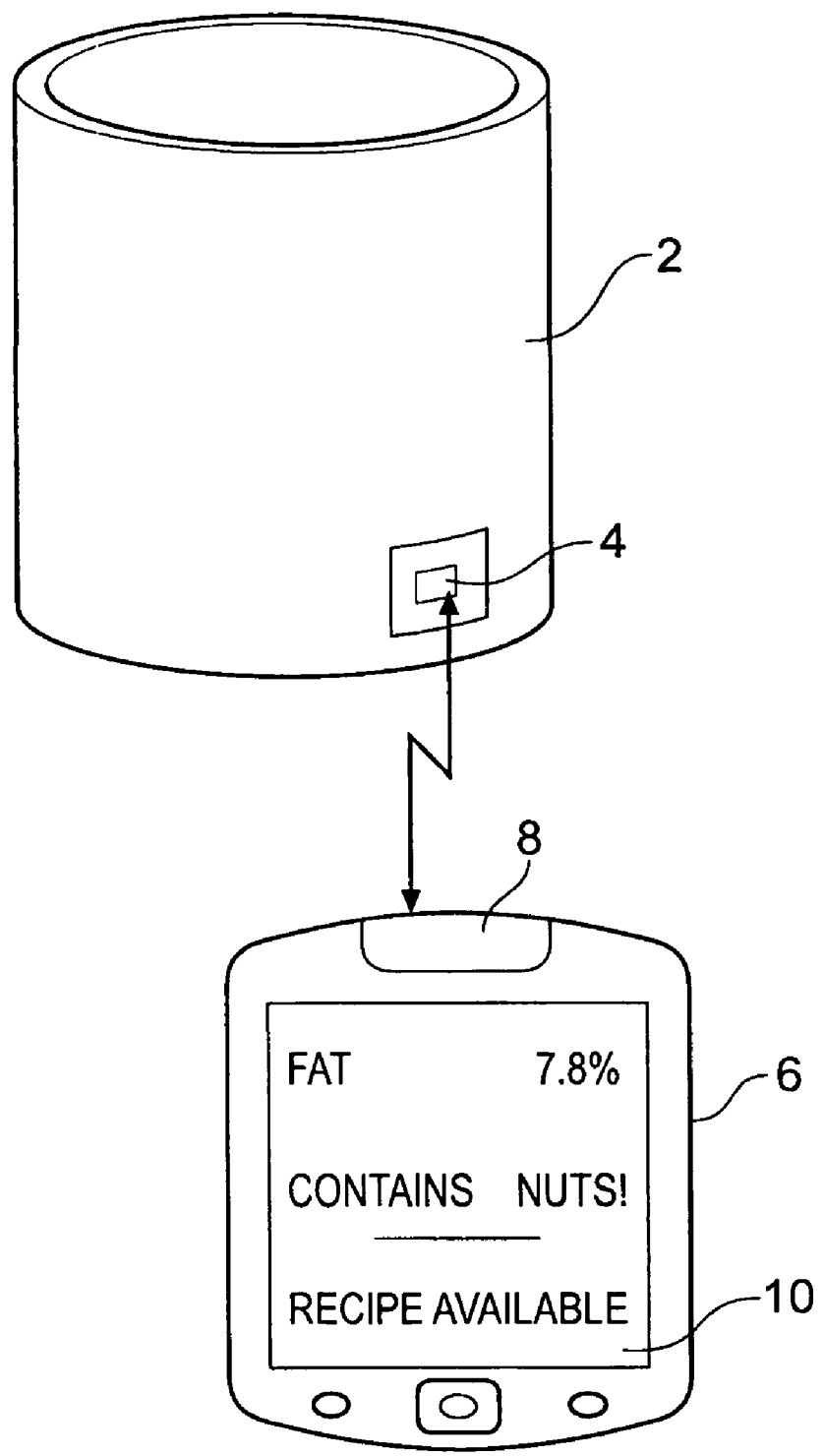

FIG. 1 illustrates an apparatus according to an embodiment of the present invention in typical use. In the embodiment shown, a product is illustrated, which in the example shown is represented by a tin 2 of food. The tin 2 has a memory tag 4 secured to the tin or the tin's label or packaging. In preferred embodiments the memory tag comprises a memory spot, a memory spot being an integrated circuit that includes flash memory and that can be read from or written to via inductive radio frequency coupling with an internal antenna. Since only an internal antenna is provided, as opposed to a separate external antenna, the memory spot must be physically located within a range of 2-3 mm of a reading or writing device. The memory spot stores a range of electronic data concerning the tinned product. In addition to identifying the product and possibly its retail price, further information such as a list of the product's ingredients, nutritional information concerning the product, recommended recipes utilising the product and recommendations for accompanying drinks or other foods may be stored on the memory spot. Since the storage capability of the memory spot is far in excess of conventional labelling technologies, including barcodes, a much greater freedom over the information to be stored concerning the product is available.

A user apparatus 6 is capable of reading the stored data from the memory tag 4 by means of an appropriate RF interface 8. The user apparatus 6 includes appropriate data processor and output means such that the information stored on the memory tag may be provided to the user. Embodiments of the user apparatus 6 are described in more detail with reference to FIG. 2. In the embodiment illustrated in FIG. 1, the user apparatus 6 comprises a pocket computer, or a PDA, having a touch sensitive display screen 10. The RF interface 8 may be integrally provided with the PDA or may be provided as an additional peripheral in a known manner. The PDA is also arranged to store user profile data relating to the individual user and their preferences. The user profile data is used to determine what elements of the product data stored on the memory tag 4 should be provided to the user by the user apparatus 6. In the example shown in FIG. 1, the user profile data has been used to identify that the fat content of the product should be displayed on the screen 10 of the PDA, together with a warning that the product contains nuts, which the user profile data will have indicated is a concern to the user, for example due to an allergy. The user profile data has also indicated that the user will be interested to know that a recipe for using the product is available. The information elements shown on the screen 10 in the example shown in FIG. 1 are of course only examples and many other information elements may be additionally or alternatively provided to the user. The user profile may also comprise a wide variety of embodiments that include data such as food preferences, dietary information of particular interest to the user, such as fat or sugar content, and any other food preferences expressed by the user.

The user apparatus 6 may belong to an individual user, as is envisaged in the case that the user apparatus is a pocket computer, organiser, mobile phone or other similar electronic device. In this case embodiments of the present invention include the provision of a user accessing and editing the profile data to add, delete or amend their preferences using the input means provided on the electronic device, such as a touch screen or keyboard. However, in other embodiments the user apparatus 6 may be provided by the product vendor for use only within the vendor's premises. In this instance a user's profile data will be uploaded to the user apparatus 6 on allocation of the apparatus to an individual user. The uploading process may take the form of accessing user profile data from a separate memory device, such as a further memory tag or further data card, that is owned by the user. Alternatively, a database of user profile data may be maintained by the vendor and accessed by users at the vendor's premises by the use of a suitable identification method, such as entry of a PIN code.

It will also be appreciated that other output interfaces may be provided other than the touch screen 10 referred to with reference to FIG. 1. For example, a conventional LCD or LED display may be provided, an audio output may be provided instead of or in addition to a visual display, or in some circumstances a printed output may be desirable.

Figure 2:
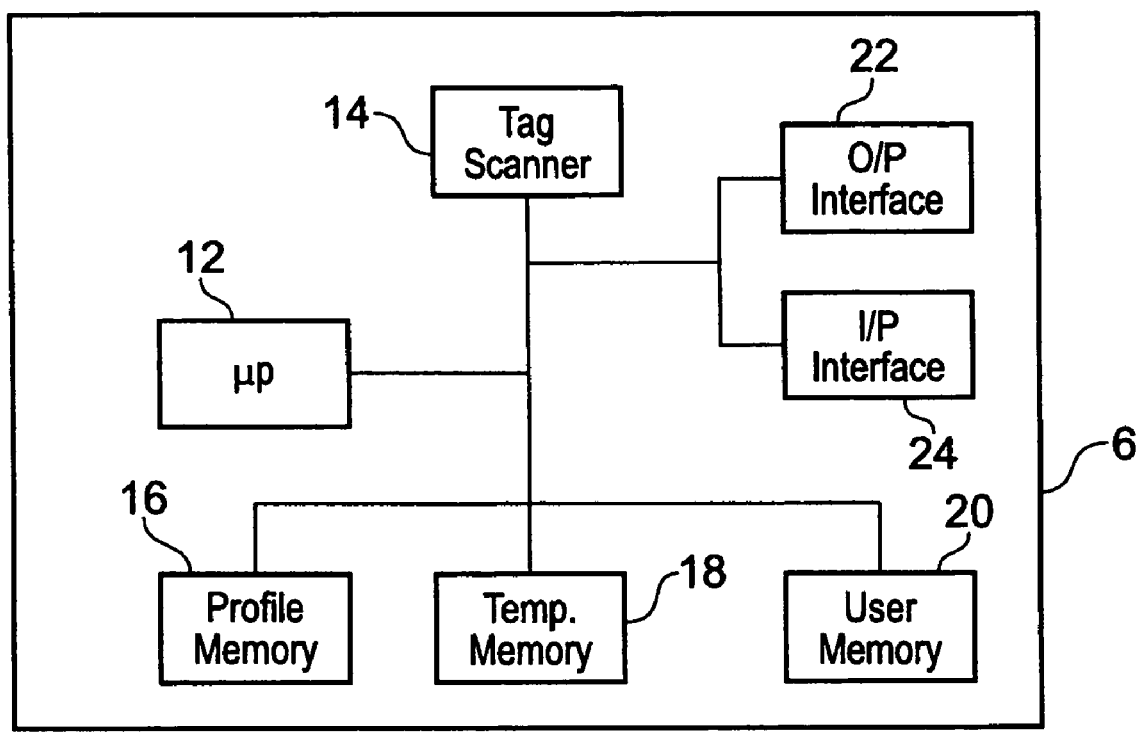
FIG. 2 is a schematic representation of the apparatus shown in FIG. 1.

FIG. 2 schematically illustrates the components of the user apparatus 6 in accordance with an embodiment of the present invention. A data processor 12 is provided that is arranged to control the operation of the other components. A memory tag scanner 14 is provided to read the product data stored within memory tags attached, or associated, to products or items. In some embodiments, the memory tag scanner 14 may be additionally arranged to write information to the memory tags as well as simply reading the information. A user profile memory 16 is provided in which the user profile data is stored. A temporary working memory 18 is also provided in some embodiments of the present invention to allow the product data read by the memory tag scanner to be temporarily stored within the user apparatus. A further user memory 20 may also be provided in some embodiments of the present invention such that product data may be selectively stored by a user. Examples of such data that may be permanently stored are the presence of redeemable tokens, or coupons, associated with the certain products. Although the user profile memory 16, temporary memory 18 and user memory 20 are illustrated in FIG. 2 as separate entities, it will of course be appreciated that they may be implemented as virtual partitions within a single memory device. Additionally, whilst it is envisaged that the memory will be provided as separate RAM or ROM memory, other embodiments may use only RAM embedded within the data processor 12. An output interface 22 is provided for controlling the available output device, a touch screen 10 in the case of FIG. 1, whilst an input interface 24 may be provided in certain embodiments to allow a user to access the user profile memory to amend the user profile stored therein.

Figure 3A:
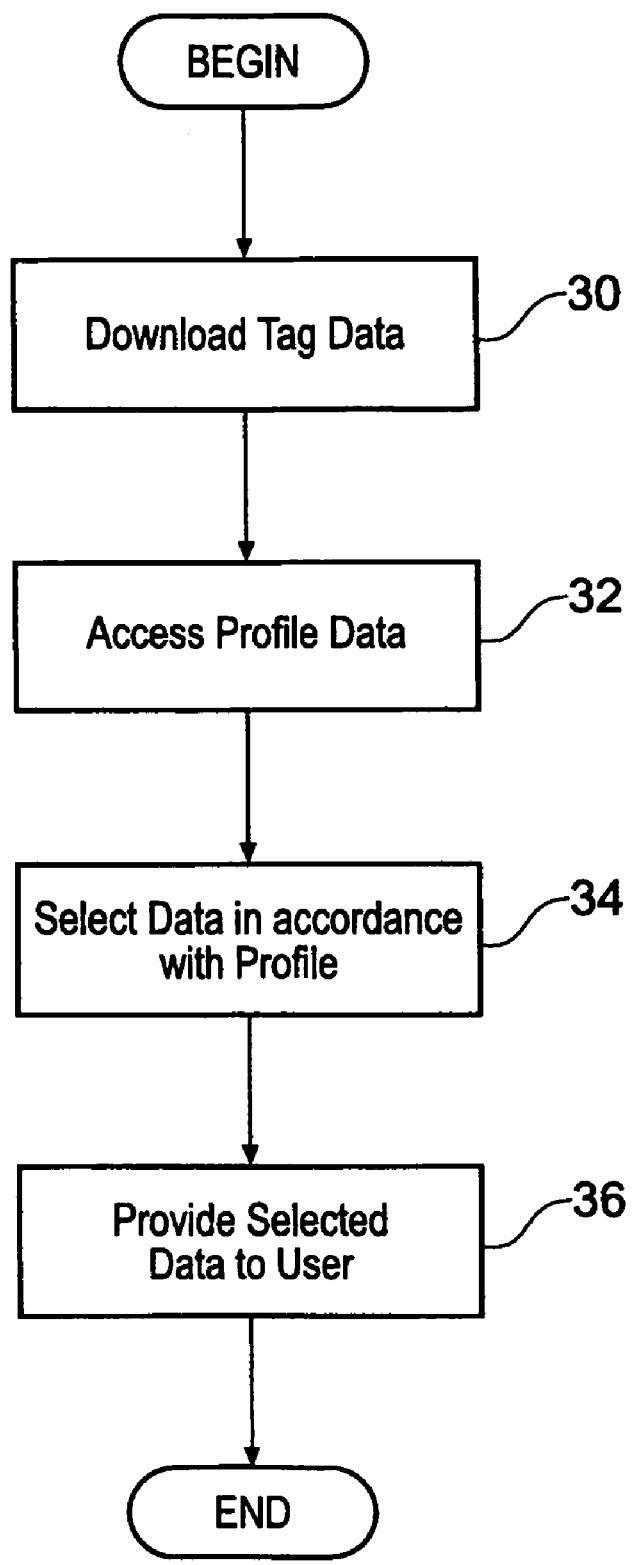
FIG. 3A illustrates a first method of operation in accordance with embodiments of the present invention.

FIG. 3A schematically illustrates a method of providing the product or item data in accordance with an embodiment of the present invention. At an initial step 30, the product data stored within the memory tag located on the product, or associated with the product, is read by the user apparatus and stored in the temporary memory 18 provided therein. At the next step 32 the user profile data stored in the user profile memory 16 is accessed by the data processor 12. The data processor 12 then selects the product data currently stored in the temporary memory 18 as dictated by the user profile. This occurs at step 34. Having selected only the data dictated by the user profile from that stored within the temporary memory 18, the data processor 12 causes the selected data to be provided to the user via the output interface 22. This occurs at step 36.

Figure 3B:
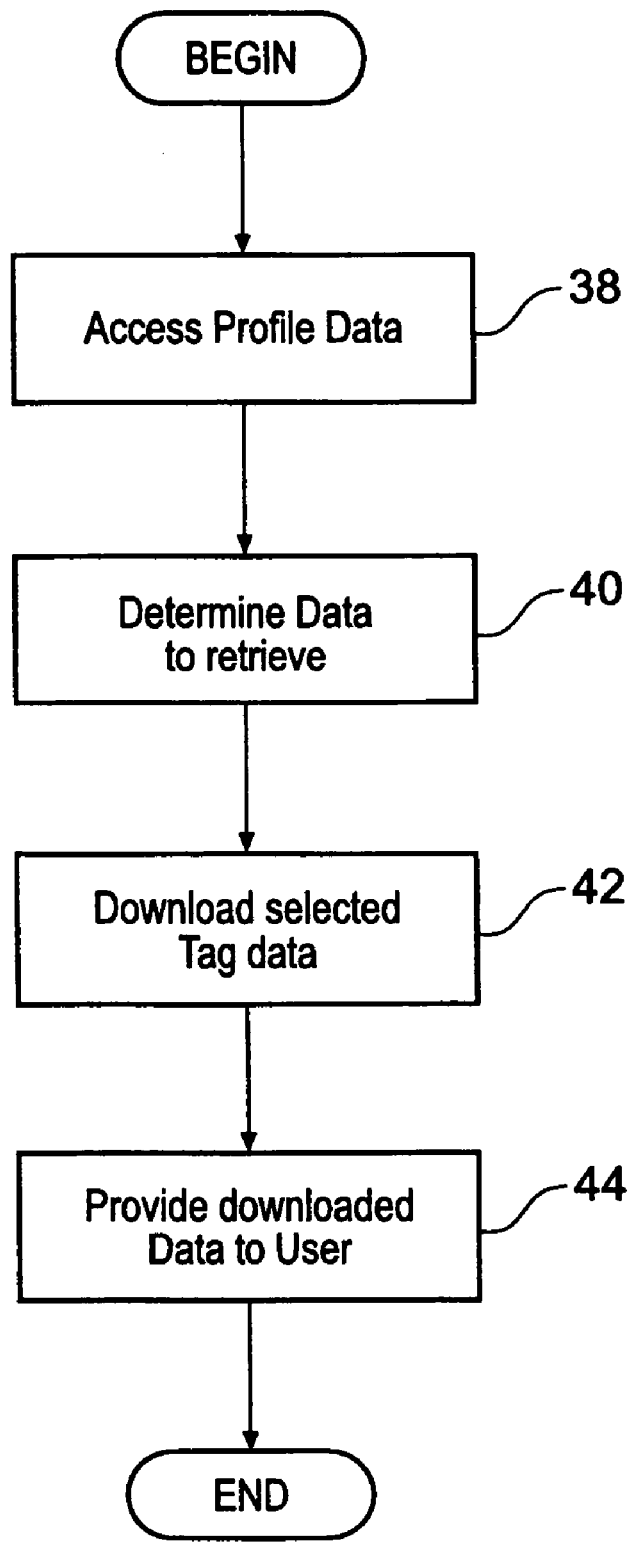
FIG. 3B illustrates a second method of operation in accordance with embodiments of the present invention.

A further method of providing the product data to a user according to alternative embodiments of the present invention is schematically illustrated in FIG. 3B. According to this method, the first step 38 is for the data processor 12 to access the user profile data stored within the user profile memory 16. At the next step 40, the data processor 12 uses the profile data to determine what product data, if available, should be retrieved. The data processor subsequently controls the memory tag scanner 14 to interrogate the memory tag associated with the product and to download only the selected product data. This occurs at step 42. The downloaded selected data is subsequently provided to the user via the output interface 22, at step 44. The advantage of the method illustrated in FIG. 3B is that there is no requirement for a temporary memory 18 within the user apparatus, thus potentially simplifying any user apparatus. However, the method illustrated in FIG. 3B requires more complex control of the memory tag scanner 14 so as to only download the selected data. The selected reading process is also likely to take longer than simply reading the complete contents of the memory tag and this increased reading time and/or complexity may outweigh the disadvantages of providing a separate temporary memory.

Although the above embodiments have been described primarily with reference to food products, it will of course be appreciated that many other applications fall within the scope of the embodiments of the present invention. For example, the memory tag may be affixed or associated with a consumer device such as, for example, a piece of audio visual equipment or an automobile and the information contained on the memory tag may relate to the operation of the device. In this case the user profile may simply include the preferred level of technical information to be provided to a user when accessing the operating instructions stored on the memory tag. The user operations may then be presented in a format and at a technical level preferred by the user. Further possible applications within the scope of the present invention include the provision of information concerning an item within a museum or art gallery. Each item may have a memory tag associated with it, for example affixed to an accompanying label, that includes information identifying the item, its age, manufacturer/artist, intended use, history and so on. The user profile stored within a user apparatus may include such details as the user's age and level of historical and/or artistic knowledge, together with preferences for the level of detailed information required, such that the user may acquire only the information concerning the item or artistic work that is of interest to them.

In all of the above applications the memory tag associated with a product or item contains the entirety of the item data and only the information specified by a user's profile stored within a user apparatus is presented to a user.

This can be achieved, in principle, in one of two ways. Firstly, only data specified within a user's profile is downloaded from the memory spot on the item; secondly, the entirety of the data stored on the item is downloaded and only the data specified in the user's profile is displayed or otherwise manifested to the user. In each instance, however, it is necessary to be able to identify, from the totality of the data stored within the memory tag, the data specified in the user profile. One relatively easy way to do this is to identify different parts of the data stored in the tag using machine-readable labels, and in the present example, the content of the data in the memory tag is labelled using Extensible Markup Language (XML).

Referring now to FIG. 5, data stored within the memory tag is stored in the form of what is known as an XML document. That is to say that the document has, inserted within it, machine-readable labels which indicate, for computational purposes, the semantic meaning of content within the document. Thus, the document has a hierarchy of labels, and at the 'root' level, is bounded by two labels or 'tags' which specify the extents of the <ProductInformation>. Within the document, there are XML tags indicating the location in the document of various other elements, such as <Nutrition>, within which there are items relating to <Fat> and <Allergy>. In each case the actual data of interest to the user is located between the relevant tags, the tags serving merely to enable the computational extraction from the document of the bits which are relevant (i.e. specified in the user profile). This is performed by any software application capable of parsing XML and extracting the relevant elements from an XML document—a process which, computationally is trivial and will not be discussed further. Thus, in the illustrated example, fat content, whether the product contains nuts and whether the packaging are recyclable is all information specified within the user profile as relevant, whereas the country of origin is not, and, accordingly, is not retrieved.

As mentioned above, the extraction or 'filtering' of the relevant material from the totality of data contained in the memory spot can be performed, in principle, either in the memory spot, or in the user device. Extraction within the memory spot does, however, require the appropriate software to be stored and run on the memory spot, and, accordingly, extraction within the user device is a preferred embodiment.

The invention claimed is:

1. Apparatus for providing electronic data associated with an item to a user, the apparatus comprising:
   a memory tag scanner arranged to communicate with a memory tag associated with an item;
   a user profile memory arranged to store user profile data therein;
   an output interface arranged to provide data to a user; and
   a data processor arranged to cause data to be read from the memory tag associated with an item and the data to be selectively provided to a user via the output interface in accordance with the stored user profile data; wherein the data processor determines the data to be selectively provided in accordance with the stored user profile and controls the memory tag interface to retrieve the selected data from the memory tag.

2. Apparatus according to claim 1, wherein the data processor selects data to be provided to the output interface from data retrieved from the memory tag.

3. Apparatus according to claim 1, wherein the user profile memory comprises read only memory.

4. Apparatus according to claim 1, wherein the user profile memory is arranged to store user profile data received via the memory tag interface.

5. Apparatus according to claim 1, wherein an input interface is provided and the user profile memory is arranged to store user profile data received via the input interface.

6. Apparatus according to claim 5, wherein the data processor is arranged to modify stored user profile data in accordance with data received via the input interface.

7. Apparatus according to claim 1, wherein the output interface is arranged to provide the user profile data to a user.

8. Apparatus according to claim 1, wherein the output interface comprises a visual display.

9. Apparatus according to claim 1, wherein the memory tag scanner comprises a wireless transceiver.

10. Apparatus according to claim 1, wherein the apparatus comprises a further memory device and the data processor is arranged to store selected elements of electronic data on the further memory device in accordance with the user profile data.

11. A method of providing electronic data associated with an item to a user, the method comprising:
    providing user profile data to a user apparatus;
    operating the user apparatus to read electronic data from a memory tag associated with an item; and
    selectively providing the electronic data to an output interface of the user apparatus in accordance with the user profile data; wherein the electronic data is selectively read from the memory tag in accordance with the user profile data.

12. A method according to claim 11, wherein the electronic data provided to the output interface is selected by the user apparatus from the electronic data read from the memory tag.

13. A method according to claim 11, wherein selected elements of the electronic data are given prominence on the output interface in accordance with the user profile data.

14. A method according to claim 11, wherein selected elements of the electronic data are stored on the user apparatus in accordance with the user profile data.

* * * * *